United States Patent [19]

Benimeli et al.

[11] Patent Number: 5,426,368
[45] Date of Patent: Jun. 20, 1995

[54] LOGGING METHOD AND APPARATUS FOR INVESTIGATING GEOMETRICAL CHARACTERISTICS OF A BOREHOLE AND FOR INVESTIGATING FORMATION RESISTIVITY

[75] Inventors: Dominique Benimeli, Chatillon; Dylan H. Davies, Viroflay; Jan W. Smits, Paris, all of France; Jacque R. Tabanou, Houston, Tex.

[73] Assignee: Schlumberger Technology Corporation, New York, N.Y.

[21] Appl. No.: 9,467

[22] Filed: Jan. 27, 1993

[30] Foreign Application Priority Data

Feb. 12, 1992 [FR] France .................. 92 01551

[51] Int. Cl.$^6$ .............................................. G01V 3/20
[52] U.S. Cl. ...................................... 324/366; 324/373
[58] Field of Search ............... 324/373, 366, 374, 375, 324/354, 355, 363, 367, 323

[56] References Cited

U.S. PATENT DOCUMENTS

| | | | |
|---|---|---|---|
| 3,065,405 | 11/1962 | Jarrett | 324/373 |
| 3,388,325 | 6/1968 | Birdwell et al. | 324/373 |
| 3,772,589 | 11/1973 | Scholberg. | |
| 4,087,740 | 5/1978 | Suau. | |
| 4,251,921 | 2/1981 | Fink | 33/178 |
| 4,286,217 | 8/1981 | Planche et al. | 324/373 X |
| 4,827,457 | 5/1989 | Seeman et al. | 367/27 |
| 5,012,193 | 4/1991 | Chen | 324/374 X |

FOREIGN PATENT DOCUMENTS 0390637 10/1990 European Pat. Off. .
1343241 10/1987 Russian Federation .
928583 6/1963 United Kingdom .

Primary Examiner—Sandra L. O'Shea
Assistant Examiner—Warren S. Edmonds
Attorney, Agent, or Firm—Leonard W. Pojunas; Martin D. Hyden

[57] ABSTRACT

A logging method and apparatus for investigating the geometrical characteristics of a borehole comprises an array of circumferentially spaced apart azimuthal current electrodes ($Aaz_i$) disposed on a sonde (21), and an annular current electrode (A) longitudinally spaced apart from the array of azimuthal electrodes. In a method of investigating the geometrical characteristics of the borehole, currents ($Ic_i$) are emitted between the azimuthal electrodes and the annular electrode (A). Monitor electrodes (M, $Maz_i$) are respectively associated with the current electrodes (A, $Aaz_i$). The potential differences ($Vc_i$) between annular monitor electrodes ($MAz_i$) are detected. In response to the detected potential differences, output signals ($Rc_i$) are generated indicative of the distances between the sonde and the wall of the borehole in a plurality of directions around the sonde. The technique can be applied to azimuthal resistivity measurements of earth formations for correcting said measurements for sonde eccentring and/or the irregular shape of the section of the borehole.

28 Claims, 4 Drawing Sheets $$Rc_i = kl \cdot \frac{\Delta Vc_i}{Ic_i}$$

$$Rc_i = k1 \cdot \frac{\Delta Vc_i}{Ic_i}$$

LOGGING METHOD AND APPARATUS FOR INVESTIGATING GEOMETRICAL CHARACTERISTICS OF A BOREHOLE AND FOR INVESTIGATING FORMATION RESISTIVITY

BACKGROUND OF THE INVENTION

The invention relates to a method and to apparatus for investigating geometrical characteristics of a borehole, and more particularly for detecting the distances between a logging sonde and the wall of a borehole in a plurality of directions around the sonde. The invention also relates to the application of such a technique to a logging method and apparatus for investigating the azimuthal resistivities of earth formations through which a borehole passes in order to correct said resistivity measurements.

Logging apparatuses are known that detect distances between a logging sonde and the wall of a borehole in a plurality of directions around the sonde. The purpose of such apparatuses is to measure a plurality of borehole diameters. An example of a mechanical implementation of such a multiple caliper tool is described in U.S. Pat. No. 4,251,921 (Fink). That apparatus comprises articulated arms adapted to come into contact with the wall of the borehole and a system for measuring the spread of the arms. That apparatus requires numerous moving mechanical parts that are liable to wear and that run the risk of jamming in difficult boreholes.

A different implementation of such a multiple caliper apparatus, based on acoustics, is described in U.S. Pat. No. 4,827,457 (Seeman et al.). That apparatus has the advantage of measuring a plurality of borehole diameters without contacting the borehole wall. It nevertheless requires a large number of acoustic sensors that are relatively expensive.

U.S. Pat. No. 4,087,740 (Suau) describes a logging apparatus having electrodes for determining the mean diameter of a borehole. In that apparatus, a first current is emitted which flows mainly into the formations, together with a second current that flows mainly in the borehole fluid. Two resistivity signals are derived in response to the first and second currents and the two resistivity signals are combined to deduce the mean diameter of the borehole. Such apparatus does not give information on the eccentring of the sonde in the borehole, nor does it give indication concerning the shape of the cross-section of the borehole.

SUMMARY OF THE INVENTION

An object of the invention is to provide a logging technique to obtain information on the eccentring of a sonde in a borehole and/or on the shape of the cross-section of the borehole, while not making contact with the borehole wall.

Another object of the invention is to provide a logging technique for detecting a plurality of radial distances between a logging sonde and the wall of a borehole, by using electrodes.

Still another object of the invention is to provide a logging technique for measuring azimuthal resistivities of the formations through which a borehole passes and in which the measurements can be corrected to take account of the eccentring of the sonde and/or of the irregular shape of the cross-section of the borehole.

In a first aspect, the present invention provides a logging method for investigating geometrical characteristics of a borehole in which an elongate sonde body is suspended, wherein electrical currents ($Ic_j$) are emitted between an array of azimuthal current electrodes ($Aaz_i$) circumferentially spaced apart on the body and an annular current electrode (A) disposed on the body, the annular electrode (A) being longitudinally spaced apart from the array of azimuthal electrodes ($Aaz_i$) in such a manner that the emitted currents flow mainly through the borehole fluid. Output signals ($Rc_j$) are generated that are a function of the resistivity of the zones through which the currents flow, thereby obtaining information relating to the distances between the body and the wall of the sonde in a plurality of directions around the sonde.

Preferably, the emission of the currents ($Ic_j$) is controlled in such a manner that they are equal to one another and of constant amplitude (Ic). The potential differences ($\Delta Vc_j$) caused by the emitted currents ($Ic_j$) between azimuthal monitor electrodes ($Maz_j$) associated with the azimuthal current electrodes ($Aaz_j$) and an annular electrode (M) associated with the current annular electrode (A) are detected, and output signals ($Rc_j$) are generated such that each is a function of the ratio ($\Delta Vc_j/Ic$) of the detected potential ($\Delta Vc_j$) divided by the current (Ic).

A logging apparatus for implementing this method comprises: an elongate sonde body adapted to be displaced along the borehole; an array of circumferentially spaced apart azimuthal current electrodes ($Aaz_i$) disposed on the body; an annular current electrode (A) longitudinally spaced from the array of azimuthal electrodes so that the currents emitted between the array of azimuthal current electrodes ($Aaz_i$) and the annular current electrode (A) flow mainly through the borehole fluid; means for emitting currents ($Ic_j$) between the azimuthal electrodes ($Aaz_j$) and the annular electrode (A); and means for generating output signals ($Rc_j$) that are a function of the resistivity of the borehole zones through which the currents flow, thereby providing information concerning the distances between the body and the wall of the borehole in a plurality of directions around the sonde.

Preferably, the device includes an annular monitor electrode (M) associated with the annular return electrode (A) and an azimuthal monitor electrode ($Maz_j$) associated with each azimuthal current electrode ($Aaz_j$).

In a second aspect, the invention provides a method of investigating the resistivity of formations through which a borehole passes, the method comprising the following steps: emitting first currents ($Iaz_i$) from an array of circumferentially spaced apart azimuthal current electrodes ($Aaz_i$) disposed on an elongate sonde body adapted to be moved along the borehole; generating first output signals ($Raz_j$) representative of the resistivity of the zones through which the first currents ($Iaz_j$) flow; emitting second currents ($Ic_j$) via the azimuthal current electrodes ($Aaz_j$), which second currents flow mainly through the fluid of the borehole; and generating second output signals ($Rc_j$) representative of the resistivity of the zones through which the second currents ($Ic_j$) flow, said second output signals being indicative of the distances between the body and the wall of the borehole in a plurality of directions around the sonde, for correcting the first output signals ($Raz_j$).

Preferably, the first currents ($Iaz_i$) are emitted at a first frequency and the second currents ($Ic_j$) are emitted at a second frequency different from the first. Auxiliary currents at the first frequency are emitted into the formations by annular current electrodes (A2) disposed on the body on either side of the array of azimuthal electrodes ($Aaz_i$) to focus the first currents ($Iaz_i$). The second currents ($Ic_i$) are emitted between the azimuthal electrodes ($Aaz_i$) and the annular current electrodes (A2) with equal amplitudes.

Each of the second output signals ($Rc_i$) is a function of the ratio ($\Delta Vc_i/Ic$) of the potential difference ($\Delta Vc_i$) detected between a monitor azimuthal electrode ($Maz_i$) and annular monitor electrodes (M3 M4) divided by the amplitude (Ic) of the second currents ($Ic_i$). To correct the first output signals, signals are generated that are representative of correction coefficients ($Cex_i$) using the equations:

$$Cex_i = 12\ Rc_i \Sigma Rc_i.$$

An apparatus according to the second aspect of the invention comprises: an elongate sonde body adapted to be displaced along the borehole; an array of circumferentially spaced apart azimuthal current electrodes ($Aaz_i$) on the body; two annular guard electrodes (A2) disposed longitudinally on the body on either side of the array of azimuthal current electrodes ($Aaz_i$); means for emitting first currents ($Iaz_i$) via the azimuthal current electrodes ($Aaz_i$); and means for generating first output signals ($Raz_i$) representative of the resistivity of the formations in a plurality of directions around the sonde. The apparatus further includes means for emitting second currents ($Ic_i$) via the azimuthal current electrodes ($Aaz_i$), which second currents flow mainly through the borehole fluid; and means for generating second output signals ($Rc_i$) representative of the resistivity of the zone through which the second currents flow, to provide an indication of the distances between the body and the wall of the borehole in a plurality of directions around the sonde whereby the first output signals ($Iaz_i$) can be corrected.

The apparatus preferably includes monitor azimuthal electrodes ($Maz_i$) respectively associated with the current azimuthal electrodes ($Aaz_i$) and two monitor annular electrodes (M3, M4) respectively associated with the guard electrodes (A2).

BRIEF DESCRIPTION OF THE DRAWINGS

The characteristics and advantages of the invention appear more clearly from the following description given by way of non-limiting example and made with reference to the accompanying drawings, in which.

DETAILED DESCRIPTION OF A PREFERRED EMBODIMENT

Figure 1:
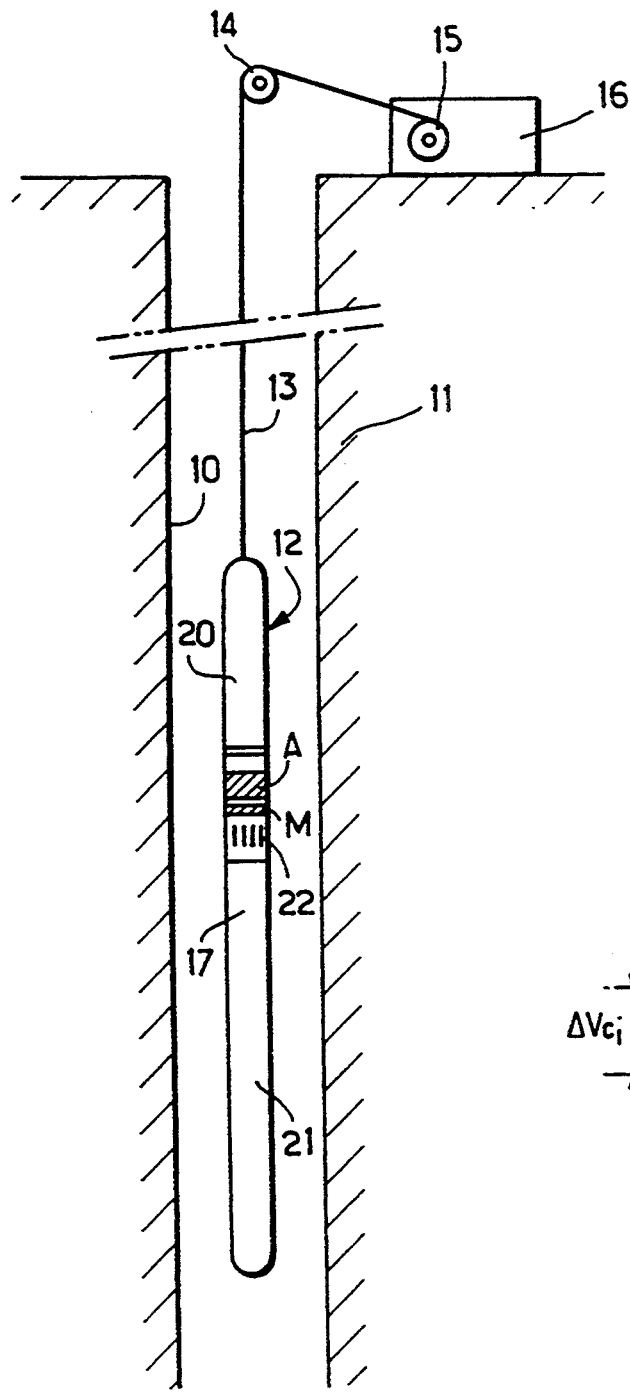
FIG. 1 shows a logging apparatus of the invention comprising a sonde fitted with electrodes for investigating the geometrical characteristics of a borehole.

With reference to FIG. 1, a logging apparatus for investigating a borehole 10 passing through the earth formations 11 comprises a sonde 12 suspended in the borehole at the end of a multiconductor cable 13. The cable 13 passes over a sheave 14 and is wound onto a winch 15 for moving the sonde 12 along the borehole. The winch 15 forms a part of a surface unit 16.

The sonde 12 comprises an elongate body 17 having a top section 20 comprising a sealed metal envelope containing electrical circuits, and a bottom section 21 suitable for being fitted with sensors (not shown) for investigating earth formations. Such sensors may be electrodes, induction coils, nuclear sensors, acoustical transducers, or other forms of sensor. In addition to such sensors, the bottom section 21 carries a set 22 of electrodes for detecting the geometrical characteristics of the borehole. Information on the shape and the size of the cross-section of the borehole and also on the eccentring of the sonde 12 within the borehole are of interest either per se for providing information about the state of the borehole, or else for correcting measurements performed on the formations.

Figure 2:
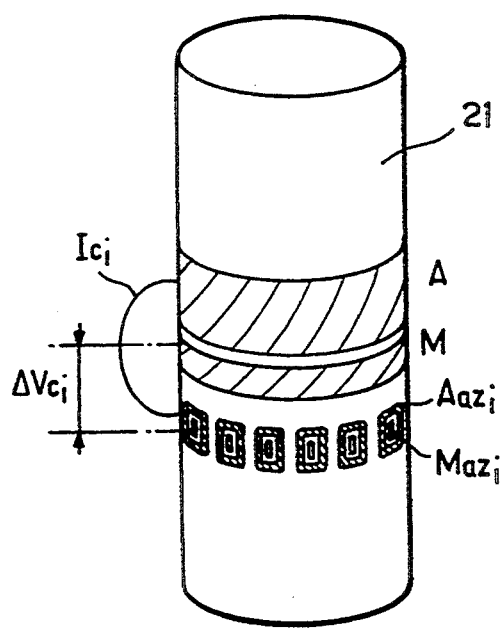
FIG. 2 shows a preferred configuration of the electrodes carried by the logging sonde of FIG. 1.

With reference to FIG. 2 which shows the set of electrodes 22 disposed on the sonde 12 in greater detail, the bottom section 21 of the body carries an annular current electrode A, an annular monitor electrode M associated with the current electrode A, and an array of twelve, circumferentially spaced apart, azimuthal electrodes. The annular current electrode A may be disposed entirely to one side of the monitor electrode M as shown in the figure, or it may comprise a portion above the annular electrode M, and a portion below it. Each azimuthal electrode includes an azimuthal current electrode $Aaz_i$ surrounding an azimuthal monitor electrode $Maz_i$, where i is an index in the range 1 to 12.

The array of azimuthal electrodes is longitudinally spaced apart from the annular current electrode A so that the currents emitted between the azimuthal electrodes and the annular electrode A flow mainly through the borehole fluid. The width in the longitudinal direction of the gap between adjacent edges of the electrode A and of the electrodes $Aaz_i$ is of the same order of magnitude as the radial distances to be detected between the sonde 12 and the wall of the borehole. In a preferred embodiment, this gap is made to be about 5 cm wide.

To provide measurements of the distances between the sonde and the wall of the borehole in a plurality of directions around the sonde, currents $Ic_i$ are emitted between the azimuthal current electrodes $Aaz_i$ and the annular current electrode A. Potential differences $\Delta Vc_i$ appear between each of the azimuthal monitor electrodes $Maz_i$ and the annular monitor electrode M. The apparent resistivity $Rc_i$ of the zone through which each current $Ic_i$ passes is given by the following equation:

$$Rc_i = k1 \Delta Vc_i / Ic_i$$

in which k1 is a constant coefficient that depends on the shape of the sonde 12. Each current $Ic_i$ has a portion which flows into the formations and another portion which flows through the borehole fluid. It has been found that each apparent resistivity $Rc_i$ is a function of the radial distance between the sonde and the borehole wall opposite the corresponding azimuthal electrode $Aaz_i$. Therefore, to obtain information on said distances, signals are generated that are representative of the resistivities $Rc_i$.

Information is thus obtained on the eccentring of the sonde in the borehole and on the possibly irregular shape of the section of the borehole without increasing the mechanical complexity of the apparatus.

Figure 3:
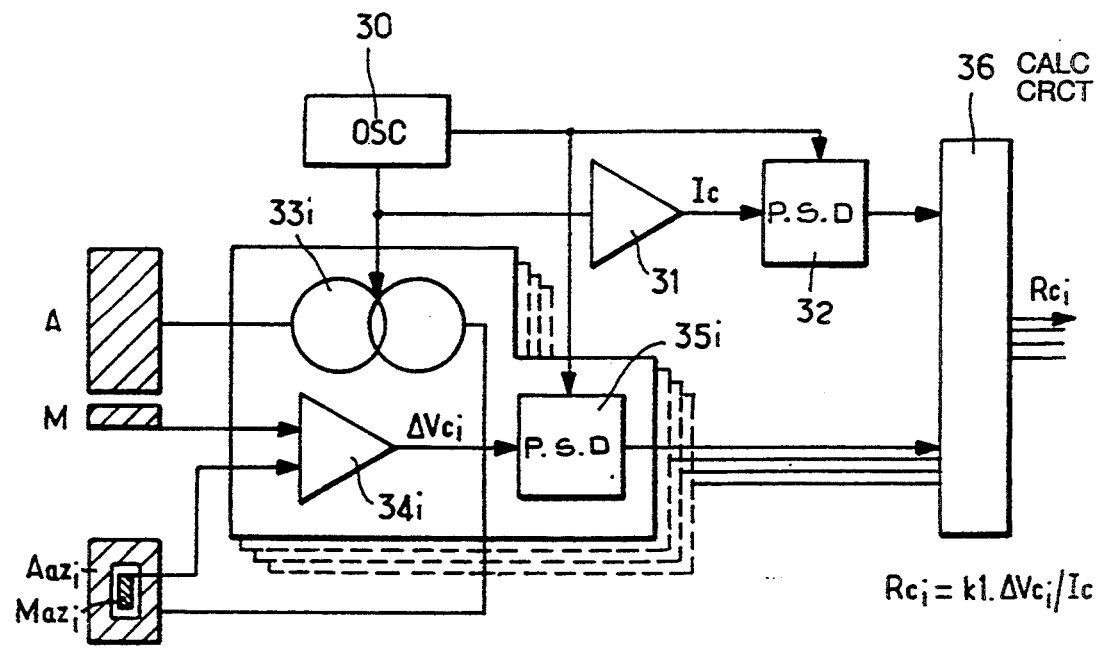
FIG. 3 is a block diagram of electrical circuits preferably usable in the apparatus of FIG. 1.

FIG. 3 is a block diagram of electrical circuits for generating such signals and constituting a preferred embodiment of the invention. In this embodiment, the amplitudes of the currents $Ic_i$ are maintained equal to a common value and the potential differences $\Delta Vc_i$ are detected.

To the left of the figure, the above-described electrodes A, M, $Maz_i$, and $Aaz_i$ are shown diagrammatically, with a single electrode $Maz_i$ and a single electrode $Aaz_i$ being shown to simplify the description. An oscillator 30 provides an alternating voltage for controlling twelve current sources $33_i$. The output from each of the current sources $33_i$ is connected firstly to an azimuthal current electrode $Aaz_i$ and secondly to an annular current electrode A for emitting an alternating current $Ic_i$ between said electrodes. The twelve current sources 33 thus emit twelve equal currents $Ic_1$. The common value Ic of the twelve equal currents $Ic_i$ is detected at the outlet of the oscillator 30 by an amplifier 31 whose output is applied to a phase sensitive detector 32.

The potential difference $\Delta Vc_i$ caused by each current $Ic_i$ between each azimuthal monitor electrode $Maz_i$ and the annular monitor electrode M is detected by an amplifier $34_i$ whose output is applied to a phase sensitive detector $35_i$. The phase references required by the phase sensitive detectors 32 and $35_i$ come from the oscillator 30. The rectified values of Ic and of the potential differences $\Delta Vc_i$ are applied to a calculation circuit 36 which generates signals $Rc_i$ using the following equation:

$$Rc_i = k1 \Delta Vc_i / Ic$$

The calculation circuit 36 may also generate twelve signals $Cex_i$ representative of eccentricity coefficients in which the influence of variations in the resistivity of the borehole fluid is practically eliminated by using the following equation:

$$Cex_i = 12\, Rc_i / \Sigma Rc_i$$

these coefficients are a function of the relative distances between the sonde and the wall of the borehole in twelve directions around the sonde.

In the embodiment described, the calculation circuit is disposed in the surface equipment 16 while the other circuits are contained in the top section 20 of the sonde 12. The thirteen rectified signals Ic and $\Delta Vc_i$ are thus sent from the sondes to the surface via the cable 13. Naturally, any other distribution of the circuits shown in FIG. 3 between the surface and the sonde could be envisaged.

Figure 4:
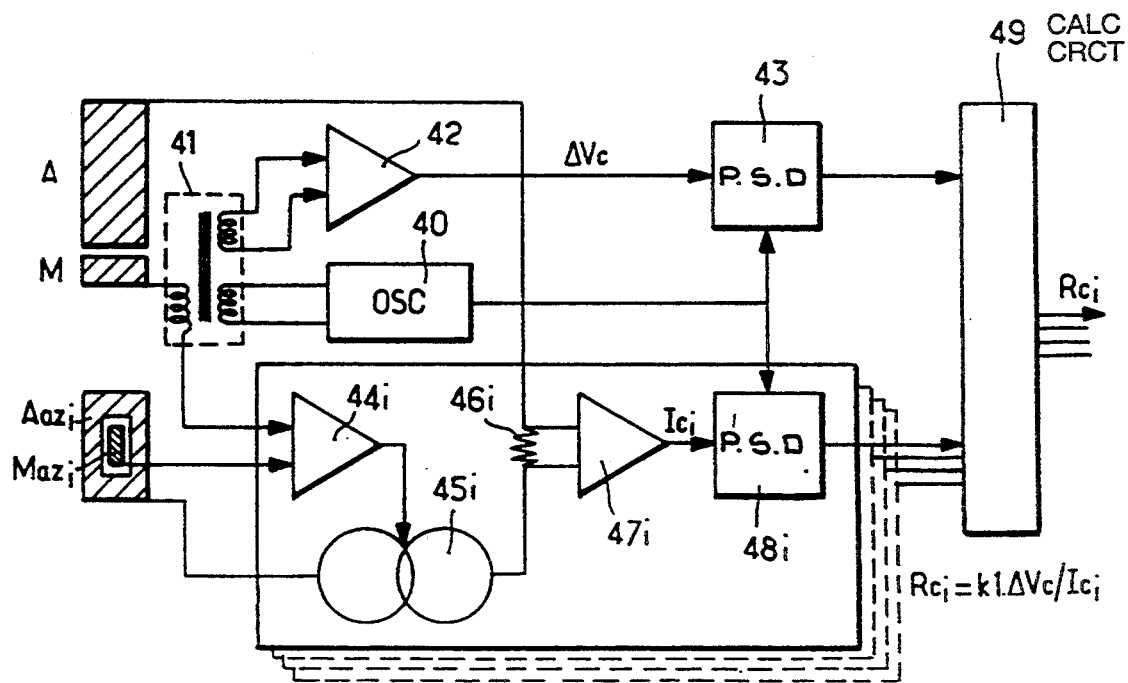
FIG. 4 is a block diagram of a variant of the electrical circuits usable in the apparatus of FIG. 1.

FIG. 4 is a diagram of the electrical circuits for generating signals $Rc_i$ in a different embodiment of the invention. In this variant, the amplitude of the potential differences $\Delta Vc_i$ is kept equal to a common value and it is the respective currents $Ic_i$ that are detected.

An oscillator 40 provides an alternating voltage to the primary winding of a transformer 41 having a first secondary winding connected between the annular monitor electrode M and one of the inputs of a differential amplifier $44_i$. The other input of the differential amplifier $44_i$ is connected to an azimuthal monitor electrode $Maz_i$, and its output is applied to a current source $45_i$. The outputs from the current sources $45_i$ are connected firstly to corresponding azimuthal current electrodes $Aaz_i$ and secondly to the annular current electrode A. In this way, the emission of the alternating currents $Ic_i$ is controlled in such a manner that the potential differences $\Delta Vc_i$ appearing between the annular monitor electrode M and each of the azimuthal monitor electrodes $Maz_i$ is kept equal to a potential difference $\Delta Vc$ of fixed amplitude. The common value $\Delta Vc$ of the twelve equal potential differences $\Delta Vc_i$ is detected by means of a second secondary winding of the transformer 41 connected to an amplifier 42 and then to a phase sensitive detector 43.

The current $Ic_i$ emitted by each azimuthal current electrode $Aaz_i$ is detected by a series resistance $46_i$ of low value placed on an output of each current source $44_i$. The terminals of each resistance $46_i$ are connected to the inputs of an amplifier $47_i$ whose output is applied to a phase sensitive detector $48_i$. The phase references required by the phase sensitive detectors 43 and $48_i$ are taken from the oscillator 40. A calculation circuit 49 generates signals $Rc_i$ using the following equations:

$$Rc_i = k1 \Delta Vc / Ic_i$$

In the variant of FIG. 4, as in the variant of FIG. 3, when the calculation circuit 49 is on the surface, thirteen signals need to be transmitted via the cable 13. In the absence of servo-control for keeping the amplitudes of the currents $Ic_i$, or the amplitudes of the potential differences $\Delta Vc_i$ constant, it is also possible to detect twelve currents $Ic_i$ and twelve potential differences $\Delta Vc_i$. Under such circumstances, twenty-four signals are transmitted to the surface via the cable 13.

In the embodiments described above, the potential differences are detected on monitor electrodes that are isolated from the current electrodes. It is also possible to connect the detection amplifiers $34_i$ and $44_i$ to the annular current electrode A and/or to the azimuthal current electrodes $Aaz_i$. The measurements then suffer from errors due to the contact impedances of the electrodes and also to the resistances of the connection wires. However, solutions can be found for reducing such errors, e.g. by using electrodes that are selected for their low contact impedances.

Figure 5:
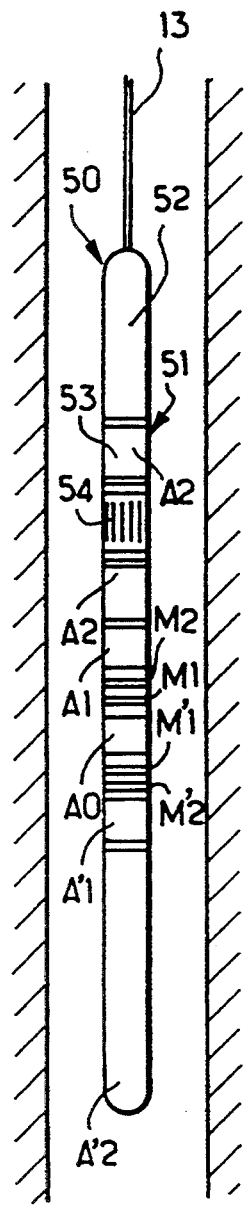
FIG. 5 shows a logging sonde for investigating the resistivity of formations in accordance with a second aspect of the invention in which the detected geometrical properties of the borehole are used for correcting measurements.

FIG. 5 shows a logging sonde 50 for investigating the resistivity of formations in which measurements are corrected by detecting the geometrical properties of the borehole. The sonde 50 suspended from a cable 13 comprises an elongate body 51 having a top section 52 which contains the electrical circuits and a bottom section 53 which carries the electrodes.

The bottom section 53 carries a first set of annular electrodes Ao, M1-M'1, M2-M'2, A1-A'1, and A2-A'2 for implementing the known "Double Laterolog" technique in deep mode LLd and in shallow mode LLs using the technique described in U.S. Pat. No. 3,772,589 (Scholberg). The electrode A2 is made of two portions having an array of azimuthal electrodes 54 together with annular monitor electrodes M3 and M4 disposed therebetween as shown in greater detail in FIG. 6. The array of azimuthal electrodes is used for measuring azimuthal resistivities as described in French patent application No. 91 14702, filed Nov. 28, 1991.

Figure 6:
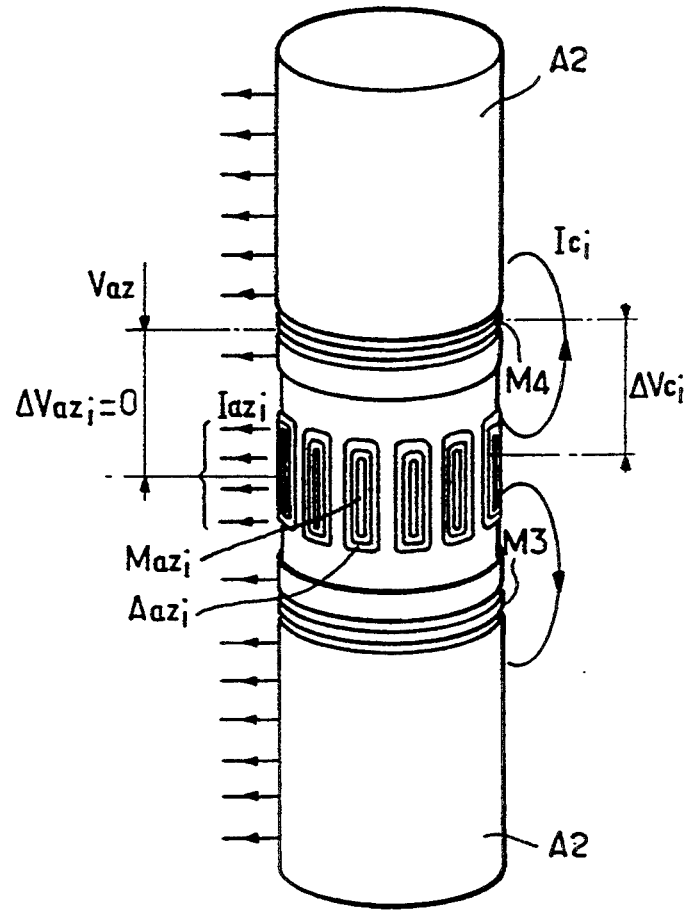
FIG. 6 shows a configuration of the electrodes carried by the logging sonde of FIG. 5.

With reference to FIG. 6 which shows the top portion of the bottom section 53, the body 51 forms two guard electrodes A2 which are respectively associated with two annular monitor electrodes M3 and M4 which are electrically interconnected. The annular monitor electrodes M3 and M4 are isolated relative to the electrodes A2 and they are situated, for example, inside respective ones of the electrodes A2. The electrode M4 could also be disposed beneath the top electrode A2 while the electrode M3 could be disposed above the bottom electrode A2. Between the two guard electrodes A2 there is disposed an array 54 of twelve azimuthal electrodes that are circumferentially spaced apart from one another. Each azimuthal electrode includes an azimuthal current electrode $Aaz_i$ surrounding an azimuthal monitor electrode $Maz_i$, where i is an index in the range 1 to 12.

To obtain resistivity measurements in a plurality of directions around the sonde, measurement currents $Iaz_i$ are emitted into the formations at a first low frequency f1 by the azimuthal current electrodes $Aaz_i$. These currents are focused by auxiliary currents emitted by the electrodes A2. A servo-control system formed by twelve servo-control loops controls the measurement currents $Iaz_i$ so as substantially to cancel each potential difference $\Delta Vc$ detected between the interconnected annular monitor electrodes M3 and M4 and each of the azimuthal monitor electrodes $Maz_i$. In addition, the potential Vaz of the interconnected annular monitor electrodes M3 and M4 is detected, and output azimuthal signals $Raz_i$ are generated each of which is a function of the ratio of the potential Vaz detected on the annular monitor electrodes divided by the current $Iaz_i$ as emitted by a respective azimuthal electrode, in compliance with the following equation:

$$Raz_i = k2\, Vaz/Iaz_i$$

where k2 is a coefficient that depends on the shape of the sonde. This technique is described in detail in the above-mentioned French patent application No. 91 14702.

Azimuthal resistivity measurements obtained in this way are sensitive to the eccentring of the sonde in the borehole. To obtain information on said eccentring for the purpose of correcting the measurements, the distances between the azimuthal electrodes and the wall of the borehole are also detected.

To do this, second currents $Ic_i$ are also emitted into the borehole fluid between the azimuthal current electrodes $Aaz_i$ and the annular monitor electrodes M3 and M4, but at a higher, second frequency f2. These currents $Ic_i$ are maintained equal to one another so that it suffices merely to detect a single current Ic. In addition, the potential differences $\Delta Vc_i$ that appear between each of the azimuthal monitor electrodes $Maz_i$ and the interconnected annular monitor electrodes M3 and M4 are detected and second output signals $Rc_i$ are generated, each of which is a function of the ratio of a respective detected potential difference $\Delta Vc_i$ divided by the current Ic emitted by each azimuthal electrode in compliance with the following equation:

$$Ic_i = k1 \Delta Vc_i / Ic$$

where k1 is a coefficient that depends on the shape of the sonde.

Information is thus obtained on the eccentring of the sonde in the borehole and on the possibly irregular shape of the section of the borehole at the exact depth where measurements are being performed. It is therefore of little importance whether or not the sonde is at an angle relative to the axis of the borehole. In addition, the mechanical complexity of the apparatus is not increased since the same electrodes are used both for azimuthal resistivity measurements and for measuring geometrical characteristics.

Figure 7:
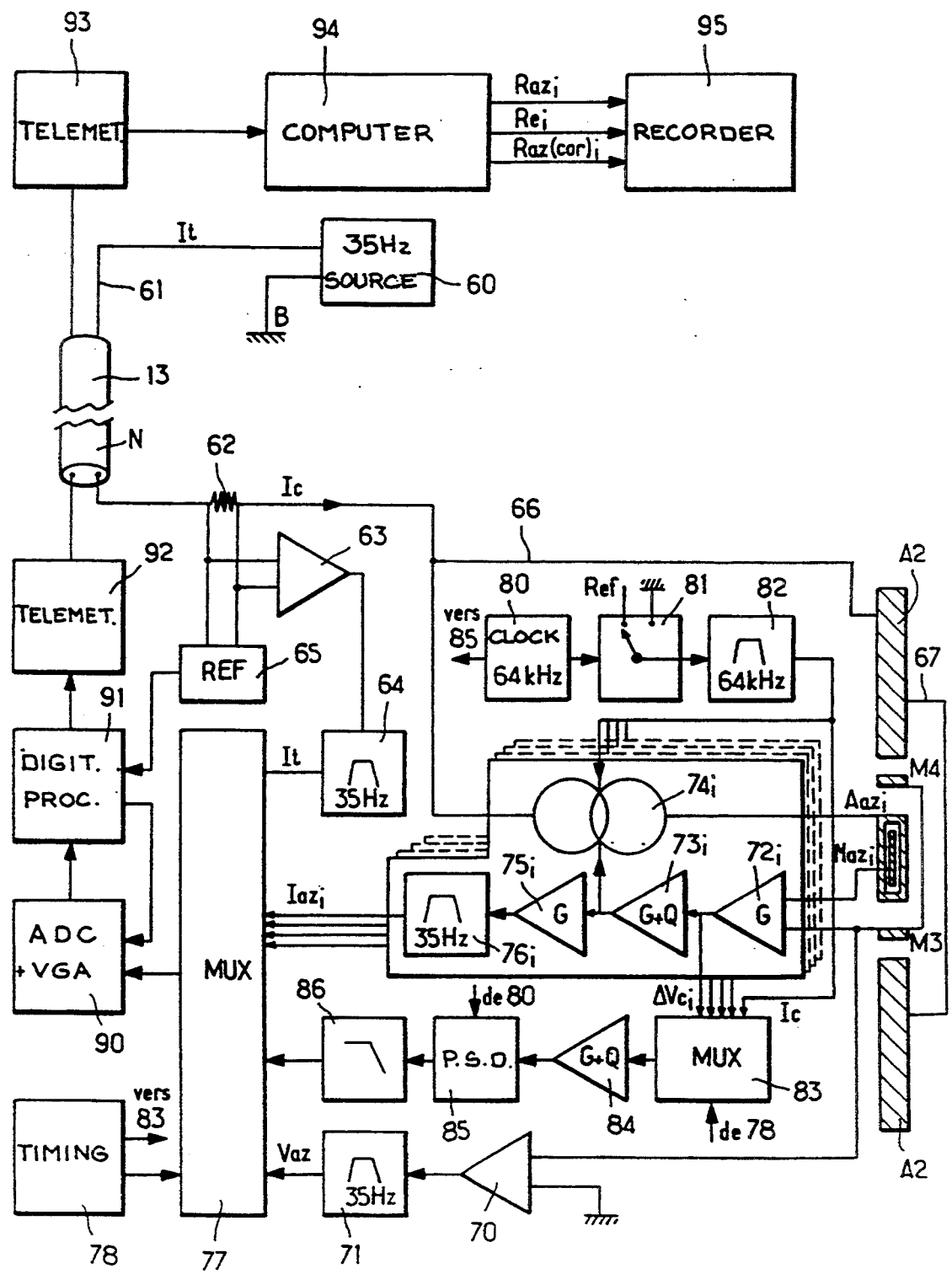
FIG. 7 is a block diagram of the electrical circuits that are preferably used in the apparatus of FIG. 5.

With reference to FIG. 7, a preferred embodiment of the electrical circuits used in the sonde of FIG. 5 is shown. To the bottom and to the right of FIG. 7 there can be seen diagrammatic representations of the electrodes A2, M3, and M4, together with a single electrode $Maz_i$ and a single electrode $Aaz_i$. Alternating current It at the frequency f1 of 35 Hz is sent from a source on the surface 60 to the downhole sonde via one or more of the conductors 61 in the cable 13. This total current It is detected downhole by means of a low value series resistance 62 whose terminals are connected to an amplifier 63 followed by a bandpass filter 64 centered on the frequency f1. The phase of the total current It is also detected by means of a phase detection circuit 65. By measuring the total current It downhole and by measuring its phase downhole, it is possible to eliminate the effects of any distortion that may occur due to transmission along the cable 13. A fraction of the total current is applied via a conductor 66 to the electrodes A2 which are electrically short circuited together as represented diagrammatically by a connection 67. The total current flows between the current electrodes and a remote electrode B situated on the surface.

A portion of the circuitry is used for making azimuthal measurements of the resistivity of the formations. The interconnected annular monitor electrodes M3 and M4 are connected to the input of a measurement amplifier 70 whose other input is connected to a reference electrode N which is constituted by the armor of the cable. The output of the amplifier 70 is applied to a bandpass filter 71 centered on the frequency 35 Hz and it provides an alternating-signal vaz representative of the potential difference between the reference electrode N and the electrodes M3 and M4.

Each azimuthal monitor electrode $Maz_i$ is connected to a differential input of a preamplifier $72_i$ having a wide frequency band and having its other input connected to the annular monitor electrodes M3 and M4. The output of each preamplifier $72_i$ is connected to the input of a high gain amplification stage $73_i$ which also has a filter function at 35 Hz, and which is in turn connected to a current source $74_i$ formed by a voltage-to-current converter. The output current from the source $74_i$ is applied between the guard electrode A2 and the azimuthal current electrode $Aaz_i$ associated with the electrode $Maz_i$ under consideration. The loop $72_i$, $73_i$, and $74_i$ controls the emission of each current $Iaz_i$ so as to cancel the potential difference between M3, M4 and the corresponding azimuthal monitor electrode $Maz_i$.

The output signal of the amplification stage $73_i$ is applied to a measurement amplifier $75_i$ followed by a bandpass filter $76_i$ centered on the frequency 35 Hz so as to provide an alternating signal $Iaz_i$ representative of the measurement current emitted by the azimuthal electrode $Aaz_i$. As represented by dashed lines in FIG. 4, the apparatus includes twelve identical channels.

The signals Vaz and It, and the twelve signals $Iaz_i$ are applied to a multiplexer 77. A timing circuit 78 controls the timing at which the signals Vaz, It, $Iaz_i$ are sampled.

Another portion of the circuits serves to detect the radial distances between the azimuthal electrodes and the wall of the borehole. A clock 80 provides pulses at a frequency f2 of 64 kHz to an analog switch 81 which produces a squarewave signal at the same frequency which is applied to a bandpass filter 82. The sinewave voltage of fixed amplitude Ic that appears at the output from the filter 82 is applied to the current sources $74_i$ so as to emit sinewave currents $Ic_i$ of fixed amplitude and of frequency f2 between each of the azimuthal electrodes $Aaz_i$ and the electrodes A2.

The output signal from each of the preamplifiers $72_i$ contains a component at the frequency f2 which is the potential drop $\Delta Vc_i$ due to one of the currents $Ic_i$ flowing mainly through the borehole fluid. The output of each preamplifier is connected to a multiplexer 83 which also receives the output signal Ic from the filter 82 and which is sampled under the control of a signal coming from the timing circuit 78. The output signal from the multiplexer 83 is applied to an amplifier 84 having a filter function centered on the frequency of 64 kHz so as to eliminate signals at a frequency other than f2. The output from the amplifier 84 is connected to a phase sensitive detector 85 having a phase reference at 64 kHz from the clock 80, with the phase sensitive detector 85 being followed by a low-pass filter 86. The multiplexed output signal from the filter 86 which is a sequence of DC signals corresponding to the common amplitude of the currents $Ic_i$ and to the amplitudes of the potential differences $\Delta Vc_i$, is applied to the multiplexer 77.

The output of the multiplexer 77 is applied to an analog-to-digital converter 90 including a variable gain input amplifier. The digital outputs from the converter 90 are applied to a digital processor circuit 91 constituted by a digital signal processor (DSP) programmed to perform a phase synchronized rectification function and a low-pass filter function on the digital signals It, Vaz, and $Iaz_i$. The phase reference required by the rectification function comes from the phase detection circuit 65. The processor circuit 91 also provides a control signal to the variable gain amplifier of the analog-to-digital converter 90 so as to reduce the dynamic range of the input signals to the converter.

The multiplexed digital signals represent the amplitudes of the currents or voltages Vaz, It, $Iaz_i$, Ic and $\Delta Vc_i$ and they are applied to a telemetry circuit 92 suitable for modulating and transmitting said signals to the surface via the cable 13. These downhole signals are received and demodulated at the surface by a telemetry circuit 93 and they are then input into a computer 94 which may be a Microvax microcomputer as sold by Digital Equipment Corporation, for example. The computer 94 performs demultiplexing of the signals Vaz, It, $Iaz_i$, Ic, and $\Delta Vc_i$, and it calculates raw formation resistivity signals $Raz_i$, together with signals $Rc_i$ representative of the radial distances between the sonde and the wall of the borehole, and it then calculates corrected resistivity signals $Raz(cor)_i$ using the following equations:

$$Raz_i = k2\ Vaz/Iaz_i$$

$$Rc_i = k1\ \Delta Vc_i/Ic$$

$$Cex_i = 12\ Rc_i/\Sigma Rc_i$$

$$Raz(cor)_i = Raz_i/Cex_i$$

in which k1 and k2 are predetermined constants that depend on the shape of the downhole sonde.

The various resistivity signals are recorded as a function of depth in a recorder device 95 which may include an optical recorder and a magnetic recorder.

It may be observed that in the above embodiment, the increase in the complexity of the device due to adding geometrical measurements thereto is minimized by maximum reuse of circuits that are already required for obtaining the resistivity signals $Raz_i$. The sources $74_i$ and the pre amplifiers $72_i$ are used simultaneously for both types of measurement $Raz_i$ and $Rc_i$. Finally, numerous other circuits such as the multiplexer 77, the converter 90, and the telemetry circuits 92 and 93 are common to both types of measurement.

The embodiments described above may naturally be subjected to numerous variants or improvements While remaining within the ambit of the invention as defined in the following claims.

We claim:

1. A logging method for investigating geometrical characteristics of a borehole, comprising the steps of:
   suspending an elongate sonde body in the borehole, said body having thereon an array of circumferentially spaced apart azimuthal electrodes and an annular current electrode longitudinally spaced apart from the array of azimuthal electrodes;
   emitting electrical currents between said azimuthal current electrodes and said annular current electrode in such a manner that the emitted currents flow mainly through the borehole fluid in a plurality of directions around the sonde;
   measuring a parameter related to the current flowing between each azimuthal current electrode and the annular current electrode said parameter being affected by the resistivity of a zone through which the current flows and being dependent at least in part, on the distance between the body and the wall of the borehole;
   generating a plurality of output signals in response to measurement of said parameter, each representative of the resistivity of the zone through which each of said current flows; and
   using said output signal to obtain information relating to the distances between the body and the wall of the borehole in said plurality of directions around the sonde so as to determine the geometrical characteristics of the borehole.

2. The method according to claim 1, wherein the width of the gap between said azimuthal current electrodes and the annular current electrode is selected of the same order of magnitude as the distances to be detected between the body and the wall of the borehole.

3. The method according to claim 1, wherein azimuthal monitor electrodes associated with said azimuthal current electrodes and an annular electrode associated with said annular current electrode are disposed on said elongate sonde body, the method further including the steps of:
   detecting the potential differences caused by said emitted currents between said azimuthal monitor electrodes and said annular electrode; and
   generating said output signals in response to said detected potential differences.

4. The method according to claim 3, further including the step of controlling the emission of said currents to make them equal to a common value.

5. The method according to claim 4, wherein said step of generating said output signals includes:
   determining the ratio of each of said detected potential differences divided by the common value of said currents; and
   generating each of said output signals as a function of said ratio.

6. The method according to claim 1, wherein azimuthal monitor electrodes associated with said azimuthal current electrodes and an annular electrode associated with said annular current electrode are disposed on said elongate sonde body, further comprising the steps of:
   controlling the emission of said currents to maintain the potential differences caused by said currents between said azimuthal monitor electrodes and said annular electrode equal to a common value;
   detecting the values of said emitted currents; and
   generating said output signals in response to said detected values of said currents.

7. The method according to claim 6, wherein said step of generating said output signals includes:
   determining the ratio of said common value of said potential differences divided by each detected current value; and
   generating each of said output signals as a function of said ratio.

8. A logging apparatus for investigating geometrical characteristics of a borehole, comprising:
   an elongate sonde body adapted to be displaced along the borehole;
   an annular current electrode disposed on said body;
   an array of circumferentially spaced apart azimuthal current electrodes disposed on the body, said array being longitudinally spaced from the annular current electrode such that currents emitted between the azimuthal current electrodes and the annular current electrode flow mainly through the borehole fluid;
   means for emitting currents between said azimuthal electrodes and said annular electrode in a plurality of directions around the sonde;
   means for measuring a parameter related to the current flowing between each azimuthal current electrode and the annular current electrode, said parameter being affected by the resistivity of a zone through which the current flows and being dependent, at least in part, on the distance between the body and the wall of the borehole;
   means for generating a plurality of output signals in response to measurement of the parameter, each representative of the resistivity of the zone through which each of said currents flows; and
   means for using the output signals to obtain information on the distances between the body and the wall of the borehole in said plurality of directions around the sonde so as to determine the geometrical characteristics of the borehole.

9. The apparatus according to claim 8, further comprising:
   an annular monitor electrode associated with the annular current electrode disposed on said body; and
   a plurality of azimuthal monitor electrodes disposed on said body, each of said azimuthal monitor electrodes being associated with a corresponding one of said azimuthal current electrodes.

10. The apparatus according to claim 9, further comprising:
    means for controlling the emission of said currents to maintain them equal to a common value;
    means for detecting the potential differences between each of said azimuthal monitor electrodes and said annular monitor electrode; and
    means for determining a function of the ratio of each detected potential difference divided by the common value of the currents emitted by the azimuthal electrodes to generate each of said output signals.

11. The apparatus according to claim 9, further comprising:
    means for controlling the emission of said currents to maintain the potential differences caused by said currents between each of said azimuthal monitor electrodes and said annular electrode equal to a common value;
    means for detecting said currents emitted by each of said azimuthal electrodes; and
    means for determining a function of the ratio of said common value of said potential differences divided by each of said detected currents to generate each of said output signals.

12. A method of investigating the resistivity of formations through which a borehole passes, the method comprising the steps of:
    suspending an elongate sonde body in the borehole, said body having thereon an array of circumferentially spaced apart azimuthal current electrodes;
    emitting first currents from said azimuthal current electrodes, said currents flowing through zones which mainly comprise the formations;
    measuring a parameter of the first currents related to the resistivity of the zones through which the first currents flow;
    generating, in response to measurement of the parameter, first output signals representative of the resistivity of the zones through which said first current flow;
    emitting second currents from the azimuthal current electrodes, said second currents flowing through zones which mainly comprise fluid in the borehole;
    measuring a parameter of the second currents related to the resistivity of the zones through which the second currents flow:
    generating in response to measurement of the parameter second output signals representative of the resistivity of the zones through which the second currents flow, said second output signals being indicative of the distances between the body and the wall of the borehole in a plurality of directions around the sonde: and
    using the first and second output signals to determine the resistivity of the formations.

13. The method according to claim 12, wherein said steps of emitting currents comprise:
    emitting said first currents at a first frequency; and
    emitting said second currents at a second frequency which is different from the first frequency.

14. The method according to claim 13, wherein annular current electrodes are disposed on the body on either side of the array of azimuthal electrodes, further including the step of emitting auxiliary currents at said first frequency into the formations via said annular current electrodes to focus said first currents.

15. The method according to claim 14, in which the steps of emitting said currents comprises:
   emitting said first current between said azimuthal electrodes and a remote return electrode on the sonde body; and
   emitting said second currents between said azimuthal electrodes and said annular current electrodes.

16. The method according to claim 14, wherein azimuthal monitor electrodes respectively associated with the azimuthal current electrodes and annular monitor electrodes associated with the annular current electrode are disposed on said body, further including the steps of:
   detecting potential differences caused by said first currents between said azimuthal monitor electrodes and said annular monitor electrodes; and
   controlling the emission of said first currents to maintain said detected potential differences at substantially zero.

17. The method according to claim 16, further including the steps of:
   detecting said first currents emitted by said azimuthal current electrodes;
   detecting the potential on said interconnected annular monitor electrodes; and
   determining a function of the ratio of said detected potential divided by each of said detected first currents to generate each of said first output signals.

18. The method according to claim 16, including the steps of:
   controlling the emission of said second currents to maintain said second currents equal to a common value;
   detecting the potential differences caused by said second currents between said azimuthal monitor electrodes and said annular monitor electrodes; and
   determining a function of the ratio of each of said detected potential differences divided by the common value of said second currents to generate each of said second output signals.

19. The method according to claim 12, including the steps of:
   generating signals representative of correction coefficients in response to said second output signals; and
   generating corrected resistivity signals in response to said first output signals and said correction coefficients.

20. An apparatus for investigating the resistivity of formations through which a borehole passes, the apparatus comprising:
   an elongate sonde body adapted to be displaced along the borehole;
   an array of circumferentially spaced apart azimuthal current electrodes disposed on said body;
   two annular current electrodes disposed longitudinally on the body on either side of the array of azimuthal current electrodes;
   means for emitting first currents into the formations via said azimuthal current electrodes;
   means for measuring a parameter related to the first currents, said parameter being affected by the resistivity of zones through which the currents flow;
   means for generating first output signals in response to measurement of the parameter representative of the resistivity of the zones through which said first currents flow;
   means for emitting second currents between said azimuthal current electrodes and said annular current electrodes in a plurality of directions around the sonde;
   means for measuring a parameter related to the second currents, said parameter being affected by the resistivity of zones through which the second currents flow and being dependent at least in part, on distances between the body and the wall of the borehole;
   means for generating second output signals in response to measurement of parameter representative of the resistivity of the zones through which said second currents flow, said second output signals being indicative of the distances between the body and the wall of the borehole in the plurality of directions around the sonde: and
   means for using the first and second output signals to determine the resistivity of the formations.

21. The apparatus according to claim 20, wherein said means for emitting currents comprise current sources respectively connected to the azimuthal current electrodes and adapted to emit currents over a wide frequency band.

22. The apparatus according to claim 21, wherein said means for emitting currents further include:
   means connected to the current sources for controlling the emission of the first currents at a first frequency; and
   means connected to the current sources for controlling the emission of the second currents at a second frequency different from the first frequency.

23. The apparatus according to claim 22, further comprising means for emitting auxiliary currents at the first frequency via said annular current electrodes to focus said first currents.

24. The apparatus according to claim 20, further comprising:
   azimuthal monitor electrodes respectively associated with said azimuthal current electrodes and disposed on said body; and
   two annular monitor electrodes respectively associated with said annular current electrodes and disposed on said body.

25. The apparatus according to claim 24, further comprising means for detecting over a wide frequency band, the potential differences between said azimuthal monitor electrodes and said interconnected annular monitor electrodes.

26. The apparatus according to claim 25 comprising means for controlling the emission of the first currents to substantially maintain at zero the potential differences at the first frequency.

27. The apparatus according to claim 24, comprising:
   means for controlling the emission of said second currents to maintain said second currents equal to one another;
   means for detecting the potential differences caused by said second currents between said azimuthal monitor electrodes and said interconnected annular monitor electrodes; and
   means for determining a function of the ratio of each detected potential difference divided by the amplitude of said second currents to generate said second output signals.

28. The apparatus according to claim 20, further including:
   means for calculating correction coefficients in response to said second output signals; and
   means for combining said correction coefficients and said first output signals to generate corrected resistivity signals.

* * * * *